T. G. STRATER.
FAUCET.
APPLICATION FILED APR. 5, 1919.
1,402,384.
Patented Jan. 3, 1922.
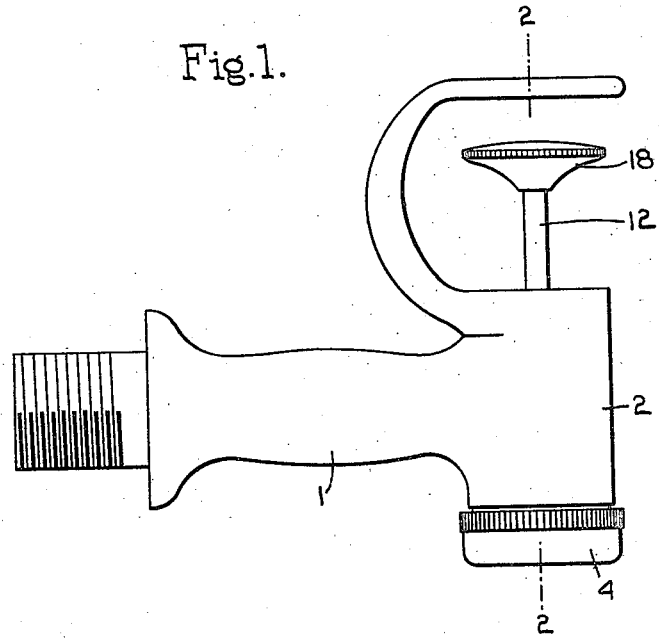
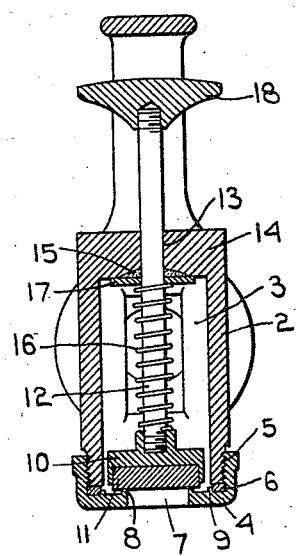
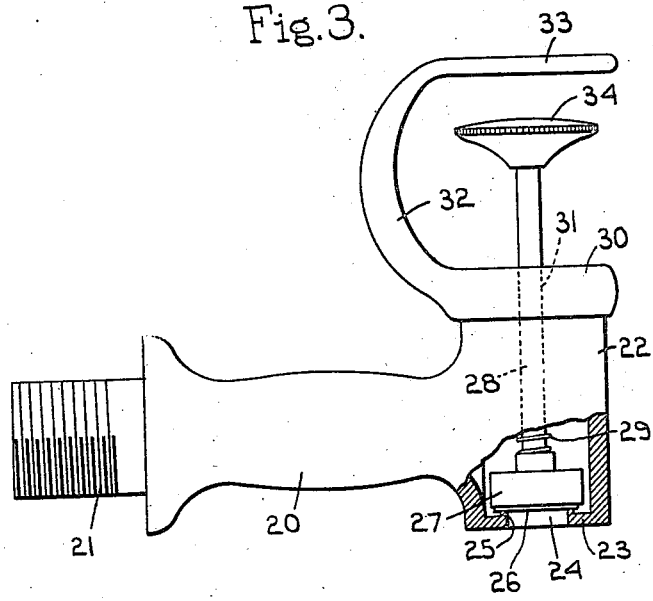
Inventor.
Theodore G. Strater
by Heard Smith & Tennant
Attys.

UNITED STATES PATENT OFFICE.

THEODORE GIRARD STRATER, OF WEST TISBURY, MASSACHUSETTS.

FAUCET.

1,402,384.     Specification of Letters Patent.     Patented Jan. 3, 1922.

Application filed April 5, 1919. Serial No. 287,904.

*To all whom it may concern:*

Be it known that I, THEODORE G. STRATER, a citizen of the United States, residing at West Tisbury, county of Dukes, State of Massachusetts, have invented an Improvement in Faucets, of which the following description, in connection with the accompanying drawing, is a specification, like characters on the drawing representing like parts.

This invention relates to improvements in faucets and the object thereof is to produce a faucet through which liquid may be delivered without dripping when the faucet valve is closed.

In faucets heretofore constructed the valve has been arranged at some distance from the mouth of the spout of the faucet and when the valve is closed such liquid as adheres to the wall of the spout, particularly if the liquid is of a viscous nature will gradually accumulate and drip from the spout. The dripping thus caused from the spouts of faucets used in soda fountains for delivering sirups and like materials is particularly objectionable and the object of the present invention is to produce a valve which will eliminate such dripping and be ornamental in appearance as well.

This is accomplished by providing a faucet with an internal valve normally acting to close the discharge aperture. Inasmuch as the valve must be raised a further improvement is to provide means for facilitating the lifting of the valve. A convenient mechanism comprises a member overhanging the lifting handle of the valve stem which will permit the operator to grasp the valve stem between the fingers and the overhanging member with the thumb and by a pinching movement easily lift the valve and hold it in open position as long as is necessary to discharge the required amount of liquid.

Other objects of the invention will more fully appear from the following description and accompanying drawings and will be pointed out in the annexed claims.

In the drawings;

Fig. 1 is a side elevation of a spoutless non-dripping faucet embodying my invention, Fig. 2 is a vertical sectional view of the same on lines 2—2 Fig. 1, Fig. 3 is a side elevation partly in section of a modified form of faucet embodying my invention.

One of the principal causes of the dripping of a faucet resides in the employment of a spout extending a greater or less distance from the valve. A further cause of dripping resides in the character of the valve which ordinarily is gradually opened and closed.

The present invention contemplates the elimination of any spout beyond the valve and the use of a valve which when closing will propel the liquid in front of it out of the aperture with sufficient force to prevent the accumulation of a drop upon the wall of the discharge aperture.

A faucet containing a preferred embodiment of my invention which is illustrated in Figs. 1 and 2 comprises a body portion 1 having a screw threaded portion at one end by which it may be secured to the cask or other container and at its opposite end a head 2 preferably of cylindrical form containing a chamber 3 which likewise desirably is cylindrical in form for convenience in manufacture.

The head 2 desirably is provided with a removable cap 4 which is secured to the end of the head by a screw threaded connection 5, a suitable gasket 6 being interposed between the end of the head and the cap to prevent leakage. The cap 4 has a central discharge aperture 7 which desirably is surrounded by a lip 8 projecting upwardly a short distance and adapted to engage the valve which serves to close the aperture. The cap may also be provided with another upwardly extending lip 9 adapted to engage the inner wall of the gasket 6 and prevent it from expanding when the cap is screwed on tightly. An internal valve 10 preferably having a fibrous face 11 is adapted to seat upon the lip 8 surrounding the aperture 7 and has a stem 12 extending upwardly through a bearing 13 in the upper wall 14 of the head 2. A bearing having a suitable packing 15 may be provided to prevent the escape of any liquid through the wall 14.

Means are provided for normally holding the valve seated to close the discharge aperture, a preferred means being a spring 16 abutting at its upper end against a plate 17 resting against the upper wall 14 of the head and at its lower end engaging the valve 10. The plate 17 is forced upwardly by the spring 16 and serves to hold the packing 15 for the valve stem firmly in position. In order to lift the valve readily the valve stem 12 is provided at its upper end with a handle 18 which may be in the form of a knob as illustrated, a hand grip or a lever. As a direct lifting movement by the hand upon a valve of this character is somewhat awkward and inconvenient I have provided a further means enabling the valve to be raised by pinching movement of the fingers engaging the valve stem handle and a stationary member located conveniently in relation thereto. In the preferred embodiment of the invention as shown in Fig. 1 the head of the faucet is provided with an upwardly extending curved member, the upper end of which overlies the handle upon the valve stem, said overlying member being positioned in such proximity to the valve stem as to be readily grasped by the thumb when the fingers are inserted beneath the handle of the valve stem, thus a pinching or gripping movement between the fingers and thumb will easily raise the valve and can be retained in such position without fatiguing the operator as would be the case if the valve were raised by direct pull upon the valve stem handle.

The overhanging member also serves to limit the movement of the valve so that no undue pressure is placed upon the valve spring after the valve has been opened to the full extent.

In Fig. 3 a modified form of spoutless non-dripping valve is illustrated. This construction comprises a body portion 20 having a screw threaded end 21 and a head 22 preferably of cylindrical form provided with an integral end wall 23. The wall 23 has a central aperture 24 the wall of which preferably is provided with an upwardly extending lip 25 adapted to engage the face 26 of an internal valve 27. The valve 27 has a stem 28 and is normally held in seated position by a helical spring 29 pressing downwardly upon the valve.

In this construction the upper end of the head 22 is provided with a cap 30 which may be secured upon it in any desirable manner as by a screw threaded connection. This cap 30 is provided with a central bearing 31 for the valve stem 28. It is also provided with a curved upwardly extending member 32 the end 33 of which overlies the handle 34 upon the valve stem. The operation of the faucet illustrated in Fig. 3 is identical with that illustrated in Figs. 1 and 2, the difference residing in the fact that in the device shown in Fig. 3 the discharge outlet is in the integral end wall of the head, whereas in the device illustrated in Figs. 1 and 2 the discharge aperture is in the cap which is removably secured to the lower end of the faucet head, the latter construction being preferable because the cap can be conveniently made upon a screw machine.

In operation the faucet is attached to the cask or other container with the axis of the aperture positioned vertically. When it is desired to draw off a portion of the contents of the container the operator slips the first and second fingers beneath the handle 34 and engages the overhanging extension with his thumb. He then pinches the thumb and fingers together, raising the handle and with it the valve, thus opening the discharge aperture. The valve when raised a sufficient distance to open the aperture to its full capacity is arrested by contact with the overhanging member and in use it preferably is desirable to open the valve fully. When the desired amount of fluid has been discharged the operator releases his grip and the spring surrounding the valve stem projects the valve against its seat. By its sudden movement the valve acts as a piston to project the fluid in front of it from the orifice and incidentally to close the orifice when it reaches its seat so that the wall of the aperture is left clean and no accumulation will occur to cause a drip.

It will be understood that the embodiments of the invention disclosed herein are illustrative and not restrictive and that various changes in form and construction may be made within the spirit and meaning of the following claims.

Having thus described my invention what I claim as new and desire to secure by Letters Patent is;

1. A spoutless non-dripping faucet comprising a body having an integral, vertically chambered head presenting a closed upper end and an open lower end, and a member having a free end overlying said head, a cap having a flat end wall provided with a central discharge aperture secured to the lower end of said head, a valve in said chamber having a stem extending through a bearing in said upper end and provided with a lifting handle located beneath said overlying member whereby the valve may be raised by the operator grasping the lifting handle with the fingers and the overlying member with the thumb.

2. A spoutless non-dripping faucet comprising a tubular body having a vertical cylindrical chambered head, provided with a lower flat end wall having a central discharge aperture and an upper end wall provided with a bearing to receive a valve stem, a valve for said discharge aperture located within said chamber, having a valve stem extending through said bearing, a lifting handle on said valve stem, means carried by the faucet head overlying the lifting handle on the valve stem whereby the valve may be raised by the operator grasping the lifting head with the fingers and the overlying means with the thumb.

3. A faucet comprising a head provided with a discharge aperture, an internal valve, means normally seating said valve to close said aperture, a valve stem having a lifting handle and a member carried by the head having a free end overlying the lifting handle on the valve stem whereby the valve may be raised by the operator grasping the lifting handle with the fingers and the overhanging means with the thumb.

In testimony whereof, I have signed my name to this specification.

THEODORE GIRARD STRATER.